(12) United States Patent
Hansen

(10) Patent No.: US 7,695,019 B2
(45) Date of Patent: Apr. 13, 2010

(54) TEXTILE BELT STRAP HAVING LOAD RECOGNITION

(75) Inventor: Holger Hansen, Hamburg (DE)

(73) Assignee: MAN Nutzfahrzeuge AG (DE)

( * ) Notice: Subject to any disclaimer, the term of this patent is extended or adjusted under 35 U.S.C. 154(b) by 0 days.

(21) Appl. No.: 12/121,104

(22) Filed: May 15, 2008

(65) Prior Publication Data

US 2008/0290643 A1 Nov. 27, 2008

(30) Foreign Application Priority Data

May 18, 2007 (DE) .................. 10 2007 023 352

(51) Int. Cl.
*B60R 22/00* (2006.01)
*A62B 35/00* (2006.01)
(52) U.S. Cl. .................. 280/801.1; 297/468; 182/3
(58) Field of Classification Search .......... 280/805, 280/801.1; 297/468, 470, 471, 472; 112/413; 182/3, 4; 244/151 R
See application file for complete search history.

(56) References Cited

U.S. PATENT DOCUMENTS 3,926,227 A * 12/1975 Takada et al. ........... 139/383 R
4,004,616 A * 1/1977 Andronov et al. ........ 139/383 R
5,039,168 A * 8/1991 Baymak et al. ............. 297/471
2002/0008376 A1 * 1/2002 Wittenberg .............. 280/801.1

FOREIGN PATENT DOCUMENTS

DE 10 2004 062 350 5/2006

* cited by examiner

Primary Examiner—Ruth Ilan
Assistant Examiner—Keith Frisby
(74) Attorney, Agent, or Firm—Robert W. Becker; Robert Becker & Assoc.

(57) ABSTRACT

A textile belt strap, especially for use in personnel safety devices in land vehicles, aircraft and watercraft. At least one seam is provided on the belt strap for representation of loading of the belt strap that occurs. The seam extends in a longitudinal direction of the belt strap over a portion thereof, and is comprised of an upper thread disposed on one side of the belt strap and a lower thread disposed on the other side of the belt strap. Respective transverse seams are fixedly connected with the belt strap for delimiting opposite ends of the seam. An interlocking of the upper thread and the louver thread is provided externally of the belt strap such that either the upper thread or the lower thread has a linear length or extension between the transverse seams that delimit the seam.

6 Claims, 1 Drawing Sheet

TEXTILE BELT STRAP HAVING LOAD RECOGNITION

The instant application should be granted the priority date of May 18, 2007 the filing date of the corresponding German patent application DE 10 2007 023 352.5/18.

BACKGROUND OF THE INVENTION

The present invention relates to a textile belt strap, especially for use in personnel safety devices in land vehicles, aircraft and watercraft.

Such belt straps are used, for example, in a known manner as safety belts for restraining a person that is sitting on a vehicle seat and is strapped in by means of the safety belts. A further application is provided with safety seats for land vehicles, aircraft and watercraft where the load caused by a person sitting in the seat is taken up by textile belt straps and is shunted into a structure that is secured to the vehicle. A safety seat of this type is described, for example, in DE 10 2004 062 350 B3, where a sitting portion that accommodates a person that is to be transported can be secured in position by means of support straps made of a textile material, stretched between the floor and the ceiling of the vehicle, and extending above and below the seating portion. With such an arrangement of textile belt straps as support straps, the seating portion is uncoupled or isolated from the vehicle chassis, so that if vibrations or impacts or so-called blasts of the vehicle occur, for example due to mines, the occupant of the vehicle is stressed less.

However, textile belt straps used in this fashion have the problem that when loading occurs, in other words when safety straps are loaded or stressed when an accident occurs, or upon loading of support straps of safety seats that are stretched in vehicles with a permanent tension, one must guess if the loading has exceeded the permissible load limit of the textile belt strap, so that if necessary the safety strap or the support strap must be replaced.

It is therefore an object of the present invention to provide a textile belt strap such that if the belt strap is stressed or loaded, one can recognize if the loading of the belt strap has remained within a permissible limit.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
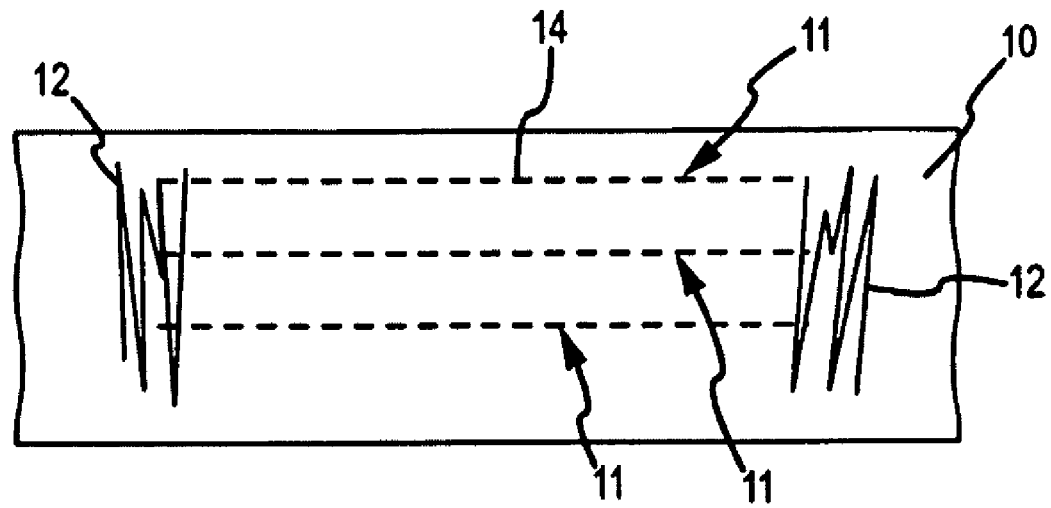
FIG. 1 is a plan view onto a section of a belt strap that is provided with three seams.

Pursuant to the basic concept of the present invention, a textile belt strap is provided wherein at least one seam is provided on the belt strap for a representation of the loading of the belt strap that occurs, wherein the seam extends in a longitudinal direction of the belt strap over a portion thereof, and the seam is composed of an upper thread disposed on one side of the belt strap, and a lower thread disposed on the other side of the belt strap; respective transverse seams are fixedly connected with the belt strap for delimiting the ends of the seams wherein an interlocking of the upper thread and of the lower thread is provided externally of the belt strap such that either the upper thread or the lower thread has a linear length or extension between the transverse seams that delimit the seams, so that these threads serve as so-called identification threads for making a loading of the belt strap that has occurred recognizable.

The present invention is predicated upon the principle that one of the two threads used for producing the seam, in other words the upper thread or the lower thread, has a single linear length or extension between the transverse seams that delimit the length of the seam. This single linear length corresponds to the extension of the belt strap between the transverse seams, while the other thread that is respectively pierced through the belt strap has a greater length. Thus, when an elongation occurs upon loading of the belt strap, the upper thread and the lower thread of the seam that is provided are differently stressed, Depending upon the permissible elongation of the belt strap, the quality or strength of the yarns or threads used to produce the threads that form the seam should be such that the identification thread of the seam, i.e. the thread having the linear length, tears with a corresponding elongation of the belt strap, thereby making a corresponding loading of the belt strap recognizable.

The present invention first of all has the advantage that a simple and clear approach is provided, due to which the belt strap is not stressed any further since no perforation of the belt strap that is under load is produced. The inventive approach can be produced without any great expenditure, and imparts a clear decision if the belt strap may need to be replaced. There is also no negative influence upon the weight of the belt strap. On the whole, the proposed approach results in an increase of the verifiable safety of a belt strap.

Pursuant to one exemplary embodiment of the present invention, a plurality of seams having threads of different strengths can be provided on the belt strap in order to make different loadings of the belt strap recognizable.

If the plurality of seams are composed of yarns having different colors, different load states of the belt strap can be made recognizable.

Pursuant to a specific embodiment of the present invention, three seams are provided having yarns of different strengths and having the respective colors green, yellow and red. For example, the color green can designate a safety of the belt strap that results at the conclusion of a stressing; if after loading of the belt strap occurs the upper thread or lower thread having the linear course that is to operate as the identification thread, as well as the other colored identification threads, remain undamaged, non critical loads have occurred. If the green identification thread is damaged, but the yellow identification thread is not damaged, one must assume that high forces have occurred; if all of the green, yellow and red identification threads are damaged, one must assume that the load that has occurred is in the critical range or greater than the critical range, thus mandating a replacement of the pertaining belt strap.

The plurality of threads can have a parallel course, and can be delimited by means of the same transverse seams.

The inventively equipped textile belt strap can be advantageously used for a safety seat in a land vehicle, aircraft or watercraft, according to which the load caused by a person sitting in the seat is taken up by textile belt straps and is shunted into a structure that is secured to the vehicle, such as described in conjunction with the safety seat of DE 10 2004 062 250 B3. If with a safety seat, for example in connection with a blasting of the vehicle, a loading of the textile support straps that hold the seating portion occurs, the loading can be observed at the condition of the threads or identification threads that are used.

Further specific features of the present application will be described in detail subsequently.

DESCRIPTION OF SPECIFIC EMBODIMENTS

Figure 2:
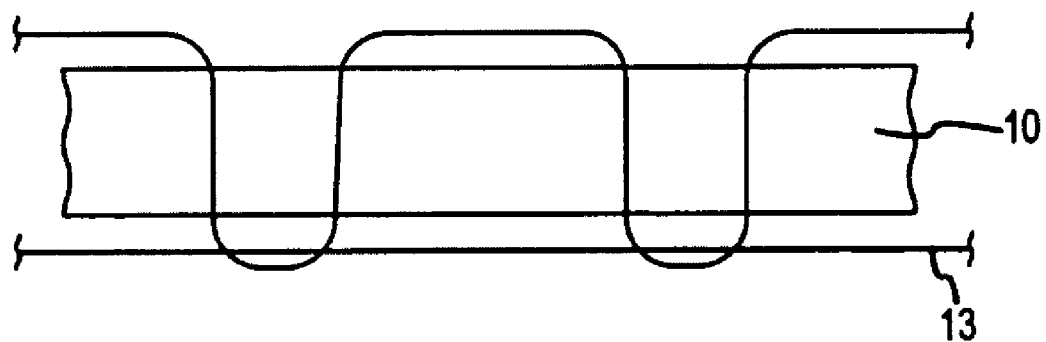
FIG. 2 is a side view of the belt strap of FIG. 1 showing a seam.

Referring now to the drawing in detail, provided on the section of a belt strap 10 illustrated in FIG. 1 are three seams 11, which extend in the longitudinal direction of the belt strap 10 over a portion thereof. The respective ends of the seams 11 are securely stitched to the belt strap 10 via appropriately disposed transverse seams 12. As can be seen from FIG. 2, each of the seams 11 is comprised of a lower thread 13 as well as an upper thread 14. During the production of the seam 11 the thread tension of the upper thread 14 is set such that the interlinking with the lower thread 13 on the underside of the belt strap 10 is effected externally of the actual belt strap. In this connections the upper thread 14 respectively pierces through the belt strap 10 and overlaps the lower thread 13, which retains a linear course before the upper thread 14 again extends through the belt strap 10 to the other side thereof. In so doing a the lower thread 13 achieves a single linear length between the transverse seams 12 that delimit the seam 11, as a result of which the lower thread 13 is significantly shorter than the upper thread 14, which respectively pierces through the belt strap 10 in a loop-like manner. If the belt strap 10 is now stressed or comes under a load, the lower threads 13 and the upper threads 14 are subjected to different loads. In other words, when the belt strap 10 is stressed, only the lower thread 13 is subjected to a brief elongation, whereupon it will tear if the stress to which it is subjected is greater than its strength. To this extent, the lower thread 13 that is shown in the illustrated embodiment is effective as an identification thread at which the stress on the belt strap 10 can be observed. In particular where a plurality of seams are provided, and hence a plurality of lower threads 13 that act as identification threads having threads of different strengths and colors, it is possible to make different stress states of the belt strap 10 recognizable.

The features of the subject matter of these documents disclosed in the preceding description, the patent claims, the abstract and the drawing can be important individually as well as in any desired combination with one another for realizing the various embodiments of the invention.

The specification incorporates by reference the disclosure of German priority document DE 10 2007 023 352.8/18 filed May 18, 2007.

The present invention is, of course, in no way restricted to the specific disclosure of the specification and drawing, but also encompasses any modifications within the scope of the appended claims.

What I claim is:

1. A textile belt strap, comprising
    at least one seam (11) provided on said belt strap (10) for a representation of loading of said belt strap that occurs, wherein said at least one seam (11) extends in a longitudinal direction of said belt strap (10) over a portion thereof, and wherein said at least one seam (11) is comprised of an upper thread (14) disposed on a first side of said belt strap (10), and a lower thread (13) disposed on a second side of said belt strap (10); and
    respective transverse seams (12) fixedly connected with said belt strap (10) for delimiting opposite ends of said at least one seam (11), wherein an interlocking of said upper thread (14) and said lower thread (13) is provided externally of said belt strap (10) such that either said upper thread (14) or said lower thread (13) has a linear length or extension between said transverse seams (12) that delimit said at least one seam (11).

2. A textile belt strap according to claim 1, wherein a plurality of seams (11) having yarns of different strengths are provided on said belt strap (10) in order to make recognizable different loadings of said belt strap.

3. A textile belt strap according to claim 2, wherein said plurality of seams (11) are comprised of threads having different colors.

4. A textile belt strap according to claim 3, wherein three seams are provided having yarns of different strengths and respective green, yellow and red yarn colors.

5. A textile belt strap according to claim 2, wherein said plurality of seams (11) are disposed parallel to one another and are delimited by the same transverse seams (12).

6. The use of the textile belt strap of claim 1 with a safety seat for a land vehicle, aircraft or watercraft, including the steps of:
    taking up a load caused by a person seated in said seat with such textile bands, and
    shunting said taken-up load into a structure secured to the vehicle.

* * * * *

UNITED STATES PATENT AND TRADEMARK OFFICE
CERTIFICATE OF CORRECTION

PATENT NO. : 7,695,019 B2 Page 1 of 1
APPLICATION NO. : 12/121104
DATED : April 13, 2010
INVENTOR(S) : Holger Hansen It is certified that error appears in the above-identified patent and that said Letters Patent is hereby corrected as shown below:

Title Page, Item (57)
In the abstract, it presently reads: "louver"
It should actually read as "lower".

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,695,019 B2  
APPLICATION NO. : 12/121104  
DATED : April 13, 2010  
INVENTOR(S) : Holger Hansen Page 1 of 1

It is certified that error appears in the above-identified patent and that said Letters Patent is hereby corrected as shown below:

Title Page, Item (73) Assignee:

MAN Nutzfahrzeuge AG (DE) should read Autoflug GmbH.

Signed and Sealed this
Twenty-fourth Day of January, 2012

David J. Kappos
*Director of the United States Patent and Trademark Office*